United States Patent
Murphy

Patent Number: 5,590,114
Date of Patent: Dec. 31, 1996

[54] COMPACT DISC PLAYBACK ENHANCER

[75] Inventor: John P. Murphy, 37508 Grove Ave., Willoughby, Ohio 44094

[73] Assignee: John P. Murphy, Willoughby, Ohio

[21] Appl. No.: 453,072

[22] Filed: May 26, 1995

Related U.S. Application Data

[63] Continuation of Ser. No. 884,283, May 13, 1992, abandoned, which is a continuation of Ser. No. 283,127, Dec. 12, 1988, abandoned.

[51] Int. Cl.⁶ .............................. G11B 7/24; G11B 33/14
[52] U.S. Cl. ............................................ 369/290; 369/288
[58] Field of Search ............................. 369/291, 283, 369/284, 286, 288, 270, 271, 272, 287, 289, 263, 264, 242, 290

[56] References Cited

U.S. PATENT DOCUMENTS

| | | | |
|---|---|---|---|
| 3,894,701 | 7/1975 | Moscaret et al. | 360/93 |
| 4,012,048 | 3/1977 | Hawkins | 369/271 X |
| 4,726,007 | 2/1988 | McCormack | 369/288 |
| 4,760,627 | 8/1988 | Schele | 425/327 |

FOREIGN PATENT DOCUMENTS

| | | | |
|---|---|---|---|
| 8504837 | 9/1985 | Germany . | |
| 60-256934 | 12/1985 | Japan . | |
| 1202884 | 8/1970 | United Kingdom | 369/271 |

*Primary Examiner*—Robert S. Tupper
*Assistant Examiner*—Paul J. Ditmyer
*Attorney, Agent, or Firm*—Rankin, Hill, Lewis & Clark

[57] ABSTRACT

The playback of a compact disc is enhanced by adhering to the compact disc an annular ring to increase the frictional engagement between the disc and the spindle upon which it turns. The playback is further enhanced by adhering a layer of soft, flexible material to dampen vibrations caused by the variations in speed by which the compact disc turns.

10 Claims, 2 Drawing Sheets

COMPACT DISC PLAYBACK ENHANCER

This is a continuation of application Ser. No. 07/884,283, filed May 13, 1992 now abandoned, which is a continuation of application Ser. No. 07/283,127, filed Dec. 12, 1988 now abandoned.

BACKGROUND OF THE INVENTION

1. Field of the Invention

This invention relates to compact disc recordings, and specifically to a means for enhancing the reproduction of sounds from compact discs.

2. Description of the Prior Art

Compact discs or CDs are recordings used in compact disc players having a laser with associated electronic circuitry to read information, such as recorded music, stored on the compact discs. Compact discs generally are created by digitally sampling the information or music source to be recorded, and recording the sampled signal as a series of pits and lands of variable length formed on a polycarbonate plastic substrate coated with an aluminum reflective coating and protected by a layer of clear lacquer. A land is the surface of the substrate between the pits. Usually, the digitally sampled recorded information is represented by transitions between the pits and lands, or vice versa, and by the absence of transitions. These transitions and absences of transitions represent the digital information stored on the compact disc and become the ones and zeroes of a digital representation of the recorded music. A modulation coding and formatting arrangement is used for organizing this digital data for compact storage and for error-reduced recapture.

The method used for converting the information stored on the compact disc is to rotate the disc on a spindle while the beam of a laser strikes the discrete bits of information on the compact disc and is reflected from the compact disc to a photosensor which reads the reflected signal and converts the light signal to a digital electronic signal. The electronic signal is conditioned and converted to an analog signal which is appropriately amplified and converted to sound energy through a loudspeaker. As the laser beam is directed at the disc, the reflected beam will experience changes in the reflective light pattern during the transitions from pits to lands. These changes are decoded as ones, and the absence of change is decoded as zeroes, the number of which depends on the length of the pit or land.

It was originally believed that the data stream recovered in a compact disc player was exceedingly robust, and that as a result the sound quality was unaffected by microphony, transmitted vibration, and other influences. However, designers have since shown that a number of mechanical areas can, and do, affect player sound quality, and that overall mass can also exert an influence. Other factors include the mass and decoupling of the compact disc transport itself, the dampening and mass of the disc clamps and of the support hub, plus the rigidity and the dampening of the case, for example, the top cover.

Less vibration reaching the transport means less work for the laser head in its task of maintaining focus on the fast moving data track. In turn, better tracking means that fewer power drain variations are imposed on the overall system, with the probability of lower data error rates. In fact, via a circuitous route, even corrected errors can be shown to affect sound quality through power supply interactions.

Thus, even though the compact disc has a very high theoretical capacity for high fidelity sound reproduction when sufficiently high effective sampling rates are employed, the musical quality of compact disc players has, nevertheless, been found to be limited. To some listeners, the resultant sound quality is described as harsh, grating, lacking in musical naturalness, piercing, booming, as having a notable loss of sound stage and presence and a general lack of naturalness.

A wide variety of improvements have been proposed to cure these deficiencies, all of which generally are directed at some specific problem. A list of improvement features includes special sampling techniques, improved analog-to-digital converters, improvement in filters, special modulation codes, particular formatting, phase shift compensation, anti-aliasing filters, separation of laser and spindle mechanisms from signal electronics into differently housed components, improved audio cables of special construction, special turntable supports such as isolating platforms for minimizing the effects of vibration, and many more. The vibrations caused by audio feedback and stray light have been implicated in some tests regarding audio quality degradation. Proposed vibration cures include improved sub-chassis construction, special suspensions, and special compact disc player support tables which claim to help isolate vibration-caused defects. In general, compact disc players have been said to possess immunity to such effects, but the proposed improvements all seem to make a suitable improvement in sound quality. Indeed, another cause of audio quality degradation may involve an intermodulation interaction between the vibration-induced fluctuations in the drive current requirements for the tracking servos which are working to remove such fluctuations, as reflected into the digital circuitry and analog electronics through common connections such as power supplies.

There is, therefore, a need for an improved compact disc playing system which will contribute to achieving a more natural, listenable, and satisfying compact disc reproduction, especially of musical material.

One solution is proposed in U.S. Pat. No. 4,726,007, issued to McCormack. This patent proposes the use of a rigid, reinforced damper disc made of material having significant loss to vibration and low sound propagation velocity. The damper disc is arranged to be laid over the compact disc and placed in loose physical contact with its upper surface to suppress and dissipate vibrational energy from the compact disc. The damper disc is light-opaque and light-absorptive.

The quality of the sound produced by a compact disc player also requires that the data track on the compact disc be read at constant linear speed. It has become an audio standard to record and read compact discs along a spiral track at a constant linear speed by rotating the disc at variable speed. Because the track is arranged in a spiral configuration on the disc, the actual rotational speed of the compact disc is varied during the playback. Compact disc players thus operate at constant linear speed and variable angular speed. The compact disc player adjusts the angular or rotational speed of the disc during play so that the track from which information is extracted is passing through the laser beam at constant speed. In practice, the laser signal starts at the center of the compact disc and works its way out toward the outer edge. The imposition of constant linear speed results in the compact disc rotating faster at the start of play or at the center of the disc than at the end of play or at the outside of the disc.

The compact disc player attempts to accomplish a constant linear speed by altering the rotational speed of the compact disc by means of a feedback servo system which uses the laser signal as part of the speed control system. Elaborate speed control systems have been developed to attempt to assure that a constant linear speed is maintained. Examples of such servo systems are shown in U.S. Pat. No. 4,338,683, issued to Furukawa et al., U.S. Pat. No. 4,539,667, issued to Fujiie, and U.S. Pat. No. 4,611,319, issued to Naito. Each of these systems senses a synchronization signal from the compact disc playback and uses the signal through a servo mechanism to control the speed of the spindle motor driver.

While such systems are generally effective, they require that the compact disc rotate at exactly the same speed as the spindle. Any variation in speed between the compact disc and the spindle, such as slippage, causes the servo mechanism to change the speed of the spindle, which, in turn, can affect the slippage.

Compact discs are made of rigid, smooth, transparent plastic. During playback, the compact disc rests on a spindle which rotates during playback. The spindles on which compact discs rest are generally polished or finely machined hard materials, such as metal or plastic. The combination of the plastic disc and the smooth, polished spindle results in a possibility of the disc slipping with respect to the spindle during playback. Such slippage is particularly likely when the speed of the spindle changes.

The macrolinear speed of the compact disc is closely controlled in the order of a few hundred revolutions per minute. In achieving a constant linear speed, angular velocity is changed during playback by the servo speed control system. There may be dislocations associated with the servo speed control. The disc changes speed during rotation play from the faster angular to the slower angular velocity in order to have a constant linear speed. This requires frequent micro changes or slowings of the angular or actual rotational speed expressed in revolutions per minute.

This problem does not occur with conventional phonographic recordings. Conventional phonographic record players have constant angular speed. In a conventional phonograph player, once a single record is rotating at the chosen speed, there is not a practical tendency for the record to slip on its turntable since the two are continuously moving at the same angular speed or revolutions per minute.

In contrast, compact discs' angular inertia will tend to be greater than that of the spindle or drive mechanism. Micro slowings determined by the servo system of control to achieve constant linear velocity can result in a braking of the drive, which braking the inertia of the compact disc will try to overcome and result in slippage of the compact disc during play, and this slippage can generate vibration of the compact disc.

There is a need for enhancing the playback characteristics or properties of compact discs by providing means to give good adhesion of the compact disc to the spindle on which it rests when it is rotated during playback. Not only is a frictional engagement enhancement needed, but there is also a need for an energy absorption means for compact discs which will allow the vibrations energy associated with slippage (or braking as noted) to be absorbed or dampened and not transmitted to the compact disc.

SUMMARY OF THE INVENTION

The present invention overcomes the disadvantages of the prior art, and fills the need for enhancing the frictional engagement between compact discs and the spindle drive as well as the need for providing a vibrational damper which will absorb minute vibrations caused as the speed of the compact disc is changed or cloned during playback.

In accordance with the present invention, a high friction coating is applied to the compact disc in the location in which the compact disc engages the spindle to enhance the frictional engagement between the compact disc and the spindle and assure that the compact disc will rotate more closely to the actual speed of the spindle as controlled by the servo mechanism.

In accordance with another aspect of the present invention, a coating is applied to the compact disc which has the ability to absorb minute vibrations caused by the changing speed of the compact disc, to prevent such vibrations from being transmitted to the spindle and to the other elements of the compact disc player.

The present invention enhances the playback characteristics or properties of compact discs by providing good adhesion between the compact disc and the spindle of which it rests when it is rotated during playback. The present invention not only provides this frictional engagement enhancement, but also incorporates energy absorption characteristics into a coating surface, which may be the frictional surface, of soft material, allowing the vibrational energy associated with slippage (or braking as noted) to be absorbed or dampened by the soft material and not transmitted to the compact disc.

These and other advantages are achieved by the compact disc playback enhancer of the present invention. The invention comprises a data storage disc for being read in a player having a spinning mechanism. The disc comprises a pulse code modulated optical disc having a data storage portion and having a drive portion for engagement by the spinning mechanism. A friction component is in contact with the disc. The friction component substantially covers the drive portion and leaves the data storage portion completely uncovered. The component has a friction coefficient greater than that of the disc for improving the frictional engagement of the disc with the spinning mechanism.

The friction component may be an annular ring, which is adhered to the disc. The ring may be adhered to the side of the disc containing the data storage portion.

The invention may further include a layer adhered to the disc, the layer leaving the data storage portion completely uncovered, the layer made from a soft flexible material for absorbing or dampening vibrations.

DETAILED DESCRIPTION OF THE PREFERRED EMBODIMENT

Figure 1:
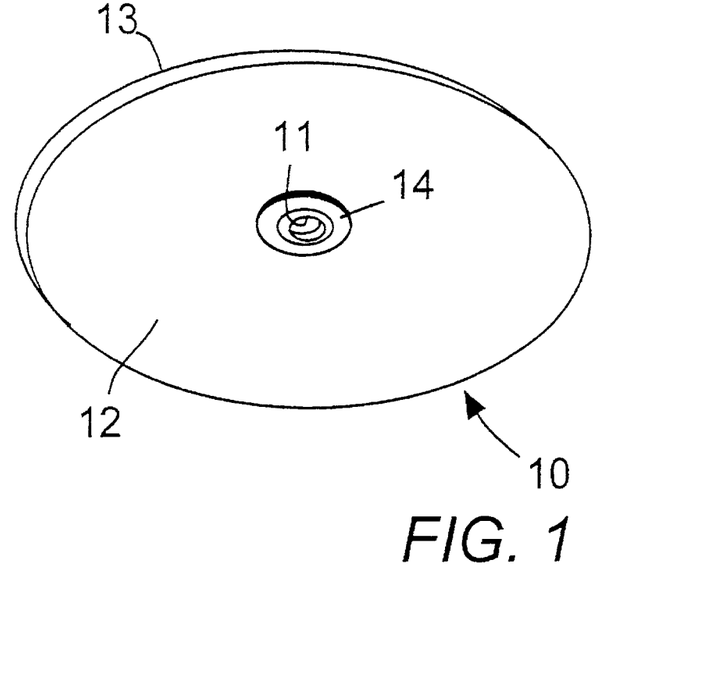
FIG. 1 is a perspective view of a compact disc showing the application of the frictional element of the playback enhancer of the present invention.
Figure 2:
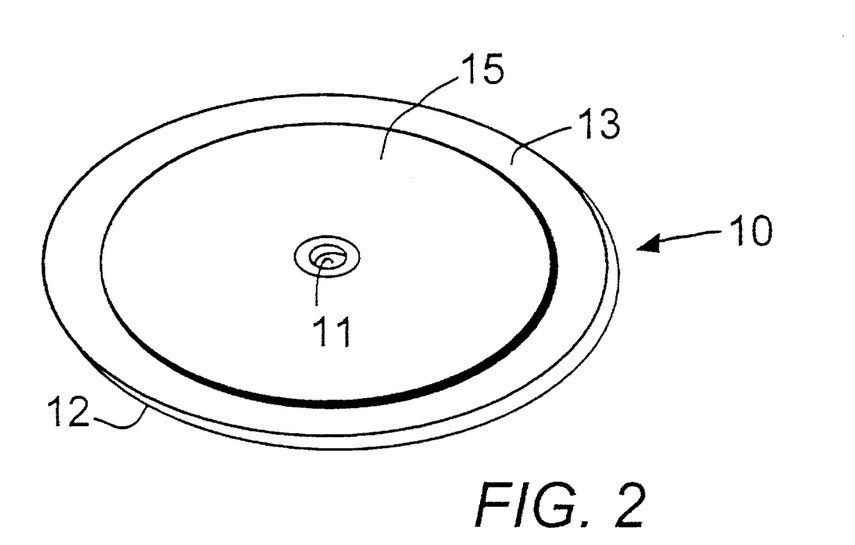
FIG. 2 is a perspective view of the other side of a compact disc such as that of FIG. 1, showing the dampening or vibration reducing element of the playback enhancer of the present invention.

Referring more particularly to FIGS. 1 and 2, there shown the compact disc playback enhancer of the present invention. A conventional compact disc 10 has a center opening 11 for engagement with the spindle of the compact disc player. The disc 10 has a lower playback surface 12 adapted to be optically read by the laser in the compact disc player, and a upper backing or nonplaying surface 13 which ordinarily contains a label identifying the disc. A typical compact disc for audio use has an outer diameter of 4.69 inches and a thickness of 0.056 inches with a center opening having a diameter of 0.58 inches.

The present invention contemplates coating the area of the compact disc that touches or contacts the spindle with a high friction component or coating, such as rubber, expanded polystyrene, silicone rubber, soft vinyl, styrene-diene polymer, or acrylic polymer, or with a tackiness agent or semi-adhesives such as used in removable labels or note pads. For instance, this area of the compact disc may be coated with a liquid plastisol which solidifies to form a soft, high-friction coating. Similarly, a film of material with desirable high friction can be adhered to the compact disc, such as adhering to the disc a thin layer of rubber, expanded polystyrene, or soft vinyl. Also, for instance, a paper or plastic film may be adhered to the compact disc or other film which has on its exposed surface a layer of rubber, expanded polystyrene, or other material that adheres well to the spindle, e.g., a self-adhesive ring that adheres tightly to the compact disc, and whose outer surface has a coating or film of material that adheres well to the spindle but which is easily separated from the spindle when removing the compact disc.

Such a coating improves the playback characteristics or properties of the compact disc by providing improved adhesion of the compact disc to the spindle on which it rests when it is rotated during playback.

Figure 3:
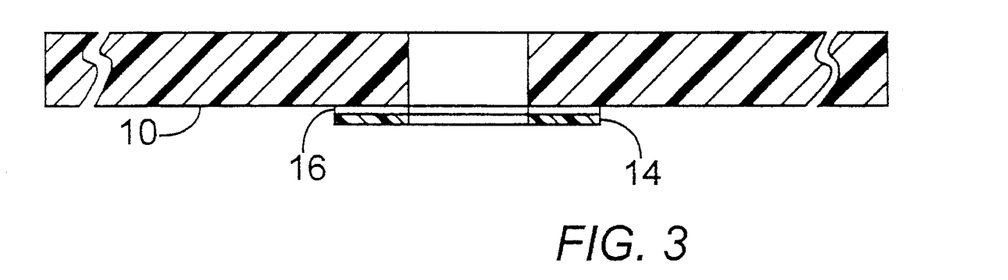
FIG. 3 is a cross sectional view of the compact disk and frictional element of FIG. 1.

In one embodiment of the present invention, as shown in FIGS. 1 and 3, this friction component takes the form of an annular ring or disc 14 applied using an adhesive 16 to lower playback surface 12 of the compact disc 10 around the opening 11 where the compact disc normally engages the spindle of the compact disc player. The ring 14 may have an outer diameter of between 1.25 inches and 1.50 inches with a center hole of 0.58 inches to 0.75 inches in diameter. The thickness of the ring 14 should be between 0.0002 inches and 0.20 inches, and preferably between 0.0002 inches and 0.0084 inches.

It is important that the frictional component be applied between the spindle and the compact disc. The frictional component can be adhered to the compact disc as just described, or, in the alternative, the frictional component can be adhered to the spindle so that the spindle has better adhesion to the compact disc during play. When the frictional component is placed between the spindle and the compact disc, the nature of the frictional component is such that it will adhere to both the spindle and the compact disc.

The ring 14 comprising the frictional component of the present invention has been described as being adhered to the lower surface or playback surface 12 of the compact disc because this is the side of the compact disc that is engaged by the spindle of all or most existing conventional compact disc players. It is conceivable that the design of compact disc players could be changed or modified so that compact discs could be driven from the upper side of the disc instead, in which case the ring should be applied to the upper surface of the compact disc.

The ring should be small enough that it does not interfere with the reading of the playback surface of the compact disc by the compact disc player. The geometry of the optical path of the laser reading the compact disc in the compact disc player is important. The distance between the spindle to the portion of the compact disc containing information is predetermined and is standard between various compact disc players in order to allow uniformity in playing of compact discs. This distance has allowable tolerances since various players are not identical. Therefore, the outer diameter of the ring must be less than the maximum possible distance to the playback portion of the compact disc, so that the player will function and read the disc properly.

Materials that have been found to be beneficial for use as the frictional component include expanded polystyrene film, rubber film, polyvinyl chloride film, polyester (Mylar) film, silicone rubber film, paper, coated paper, and the like. Specific combinations that are suitable for use as a frictional component include expanded polystyrene film, which may be simply a ring of film laid on the spindle or a ring of film adhered to the central area of the compact disc, so that the ring does not interfere with the playback of the compact disc. Another possibility is a vinyl film adhered to the compact disc or a vinyl film coated with silicone rubber adhered to the compact disc. Other possibilities include paper adhered to the compact disc, polyester film adhered to the compact disc, or rubber-coated paper adhered to the compact disc. Such frictional components could be applied during the manufacture of the compact disc, either with the use of adhesives or by the use of mechanical means. In addition to their frictional properties, components adhered to the compact disc may also provide the damping or vibration-reducing potential capability.

Acoustically, it has been found that the best performing materials have been softer ones, and the ones with the highest dynamic friction coefficients as estimated by subjective measurement. This measurement of dynamic friction coefficient for a compact disc showed a ion coefficient of friction or tendency for the compact disc to slip easily over metal or plastic. Effective materials, as noted above, had significantly higher dynamic coefficients of friction than the compact disc.

While the use of the ring 14 as the frictional component is preferred, other forms of frictional components can be used. For example, the frictional component may comprise a series of separate dots of a frictional material, or the component may comprise a number of small strips of frictional material arranged around the opening. Other forms for the frictional component are possible.

Figure 4:
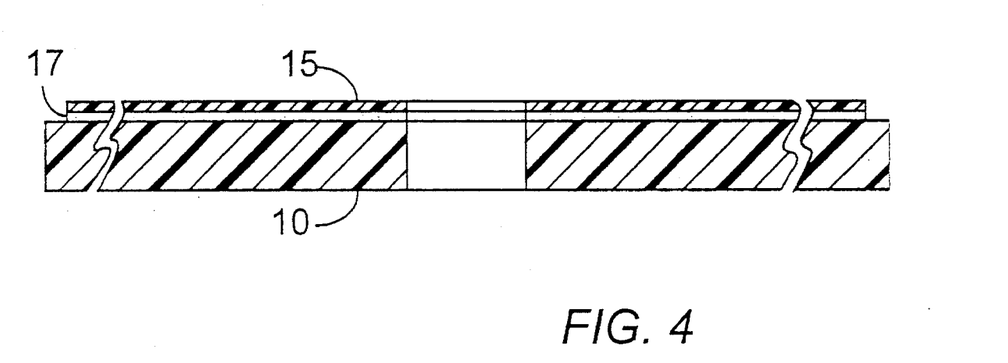
FIG. 4 is a cross sectional view of the compact disk and dampening or vibration reducing element of FIG. 2.

The playback characteristics or properties of the compact disc may be further improved by providing means for dampening or reducing any tendency for vibration of the compact disc. This other aspect of the present invention involves the function of dampening or altering the vibrational potential of the compact disc. This can be accomplished, as shown in FIGS. 2 and 4, by coating all or part of the upper backing or non-playing surface 13 of the compact disc with an energy-absorbing film layer or upper disc 15 that reduces the ability of the compact disc to vibrate.

For example, such a coating layer 15 may be applied by covering the upper backing surface 13 of the compact disc with a liquid or emulsion which dries or cures to form an adherent elastic film over the upper surface of the compact disc. Vinyl plastisols which dry to form clear, soft, elastic films could be used. Alternatively, the upper surface 13 of the compact disc may be coated with a self-adhesive, flexible plastic film, self-adhesive paper, or coated paper to form the upper layer 15.

The desirable properties of the upper layer 15 are that the layer be relatively thin, that the layer be self-adhesive or adhesive to the compact disc, that the layer be transparent, and that the layer be low mass. A film of flexible, non-rigid material may be adhered using an adhesive 17 to the upper surface 13 of the compact disc to form the tipper layer 15. Such films may be clear, transparent, colored, or opaque. For practical purposes, the film used for the upper layer 15 should be clear so that the label on the tipper surface 13 of the compact disc is still visible. The film should also be relatively thin to avoid interfering with the rotation of the compact disc. Effective films can be as thin as 0.001 inch and can be up to 0.0035 inch or thicker. The use of an adhesive film of low mass is desirable because its mass is sufficiently low that if it is not centered precisely, it will not affect the moment of inertia or rotation of the compact disc. Preferably, the mass of the upper layer 15 is less than about 0.1 ounces. Since compact discs are approximately 0.056 inches thick, it can be seen that effective films for adhering to the top of the compact discs are very thin compared to the thickness of the disc. Suitable films for this purpose include polyvinyl chloride film, commonly found in Contact brand self-adhesive films, or polyvinyl chloride film such as that available from Avery International, Fasson Specialty Materials Division, Painesville, Ohio, in a thickness of 0.0025 inches, and polyester film in a thickness of 0.002 inches from Fasson, or from Tekra Corporation, New Berlin, Wis.

The upper layer 15 may be in the form of a disc having an outer diameter of between 4.5 inches and 4.690 inches with a center hole of 0.58 inches to 0.75 inches in diameter. The thickness of the upper disc 15 should be between 0.0005 inches and 0.20 inches, and preferably between 0.002 inches and 0.0045 inches.

The upper disc 15 may be as large as the compact disc (or other optical disc) to which it is adhered, or it may be smaller than the compact disc to which it is adhered. There is a practical limit for the smallest size of the tapper disc in order to achieve the dampening or vibration reducing advantages of the present invention.

As shown in FIGS. 1 and 2, each of these functions may be combined with both layers 14 and 15 applied to the compact disc. The combination of the two functions improves the compact disc playback results, and provides outstanding improvement in the quality of the compact disc playback.

While a film which provides the frictional component or a film which provides the dampening or vibration altering potential will each individually improve compact disc playback, two or more layers of films which provide a combination of both functions produce synergistic results and greatly improve the quality of the playback. A particularly excellent combination is the application of a 0.0025-inch ring of cast vinyl film, available from Fasson, to the lower playback side of a compact disc with a 0.002 inch flexible polyester film available from Tekra to the upper backing side of the compact disc.

The following is a list of suitable flexible materials which are appropriate for making the layers to adhere to either side of the compact disc:

|  | Shore Hardness A |
|---|---|
| Elastomers and Rubbers | |
| Polyisoprene - natural rubber | 30–100 |
| Polyisoprene - synthetic rubber | 40–80 |
| Styrene - butadiene | 40–100 |
| Butadiene (polybutadiene) | 45–80 |
| Isobutene-isoprene (butyl rubber) | 30–100 |
| Chlorinated isobutene-isoprene (chlorobutyl rubber) | 30–100 |
| Ethylene-propylene (EP rubber) | 40–90 |
| Chloroprene (neoprene) | 40–95 |
| Chlorinated polyethylene (Tyrin) | 40–100 |
| Chlorosulfonated polyethylene (Hypalon) | 40–95 |
| Acrylonitrile-butadiene (Nitrile or Buna N rubber) | 20–90 |
| Epichlorohydrin homopolymer or copolymer | 40–90 |
| Polyacrylate | 40–90 |
| Polymethacrylate | |
| Polysulfide (Thiokol) | 20–90 |
| Polysiloxane (silicone rubber) | 15–90 |
| Ethylene-acrylic | 40–95 |
| Fluoro vinyl methyl siloxane (fluorosilicone rubber) | 35–80 |
| Polyester or polyether urethane (urethane) | 35–100 |
| Chloroprene | — |
| Butyl acrylate | — |
| Ethylene-propylene-diene monomer (EPDM) | — |
| Acrylate rubbers - polymers of methyl, ethyl, or other alkyl acrylates | 40–90 |
| Acrylate polymers and copolymers | — |
| Methacrylate polymers and copolymers | — |
| Flexible Thermoplastics | |
| Expanded polystyrene | — |
| Expanded polyethylene | — |
| Expanded polypropylene | — |
| Urethane foam (flexible) | — |
| Plasticized polyvinyl chloride | — |
| Polymerized and copolymerized vinyl monomers | — |
| Polyester (polyethylene terephthalate) | — |
| Ethylene-vinyl acetate copolymers | — |
| Polybutylene | — |
| Mixtures of polyvinyl chloride plus other polymers or rubbers | — |
| Polyester foam | — |
| Polyether foam | — |
| Polyvinyl acetate | — |
| Dimethyl silicone polymers | — |
| Methyl vinyl silicone | — |
| Thermoplastic Elastomers | |
| Polyurethane | 65– |
| Styrene block polymers | 28–95 |
| Elastomeric Alloys | |
| Polypropylene plus EPDM rubber | — |
| Polypropylene plus nitrile rubber | — |
| Plasticized alloys of partially cross linked ethylene interpolymers and chlorinated polyolefins | 55–80 |
| Other | |
| Paper | — |
| Mixtures of the above | — |
| Non-rigid adhesives employing any of the above chemical types | — |

The softness of the materials in above table is described in terms of Shore hardness. The Shore A scale is used for relatively soft materials such as rubbers, and therefore is appropriate for the purpose of describing the materials herein. The Shore method measures the pressure needed to indent a relatively thick layer of material, on the order of ⅛ inch. Since the materials being used are very thin in combination with an adhesive that does not harden and remains as an extremely viscous liquid, even the relatively harder materials are usable because of their thinness and, therefore, their flexibility.

The adhesive 16 or 17 used either to adhere the ring 14 onto the lower playback side of the compact disc or to adhere the disc layer 15 onto the upper backing (nonplaying) side of the compact disc can, and does, contribute to the dampening of the disc. The thickness and nature of the adhesive will determine the amount of dampening provided by the adhesive. Adhesives employed are polymeric and chemically related to several of the species mentioned in the table above. The adhesives can be likened to plastics or rubbers of extreme softness or penetrability. Typical adhesives are rubber-based or rubberlike materials, such as natural rubber or silicone rubber or acrylic ester polymers, or similar polymers. They can be considered extremely viscous liquids. The adhesives involved are non-rigid and flexible or extremely soft but coherent liquids.

Non-rigid polymeric adhesives such as those based on rubber or acrylic polymers and the like have some of the properties of elastomers, such as flexibility, creep resistance, resilience, and elasticity, and do provide useful dampening to enhance the quality of playback of compact discs. The chemistry of non-rigid polymeric adhesives is diverse, and includes polymers of the types of materials described herein as elastomers and rubbers, as flexible thermoplastics, and as thermoplastic elastomers. For the purposes of this invention, the appropriate adhesives are included within the above-listed definitions of elastomers and rubbers, flexible thermoplastic, thermoplastic elastomers and elastomeric alloys.

EXAMPLE 1

An example of a compact disc playback enhancer of the present invention involves the preparation and use of a single annular ring or disc having three layers, applied to the lower surface or playback surface of a compact disc. The first layer or outer layer of the ring is a 1.5-mil (0.0015-inch) thick film of silicone rubber. This first layer is self-adhered to a second layer or substrate, which is a 3.2-mil (0.0032-inch) thick layer of paper. The third layer or adhesive layer is a 1.5 mil (0.0015 inch) thick layer of rubber adhesive which is used to adhere the ring to the compact disc. The combined thickness of the three-layer ring is 6.2 mils (0.0062 inches), and the ring has an outer diameter of 1.25 inches and a central opening of 0.66 inches in diameter.

The ring prepared in accordance with this example is centered and adhered to the lower surface or playback surface of a compact disc using the rubber adhesive of the ring. When the compact disc was played in a conventional compact disc player, the addition of the ring resulted in a very major improvement in acoustic quality over the compact disc without the ring.

EXAMPLE 2

Another example of a compact disc playback enhancer of the present invention involves the preparation and use of both an annular ring applied to the lower surface or playback surface of a compact disc and a film layer applied to the upper backing surface of the compact disc.

The annular ring has three layers, and is essentially identical to that described above in Example 1. The outer layer of the ring is a 1.5-mil (0.015-inch) thick film of silicone rubber. Suitable silicone rubber is available from General Electric Company, Silicone Products Division, Waterford, N.Y. This outer layer is self-adhered to a substrate, which is a 3.2-mil (0.0032-inch) thick layer of paper having on its other side a 1.5-mil (0.0015-inch) thick layer of rubber adhesive which is used to adhere the ring to the compact disc. Such a paper plus rubber adhesive layer is marketed as a product called Avery Self-Adhesive Label by Avery Label Company, Chicago, Ill. The combined thickness of the three-layer ring is 6.2 mils (0.0062 inches), and the ring has an outer diameter of 1.25 inches and a central opening of 0.66 inches in diameter.

The upper film layer is a disc of a 2.0-mil (0.0020-inch) thick, colorless, transparent polyester film coated with a 1.0-mil (0.0010-inch) thick, colorless, transparent layer of flexible acrylic polymer adhesive. A suitable product that combines the polyester film with acrylic polymer adhesive is marketed as a self-adhesive overlaminating film designated FasCal Super Cold Seal by Avery International, Fasson Specialty Division, Painesville, Ohio. The resulting disc is 3.0 mils (0.0030 inches) thick, and has an outer diameter of 4.5 inches and a central opening of 0.66 inches in diameter.

The ring prepared in accordance with this example is centered and adhered to the lower surface or playback surface of a compact disc using the rubber adhesive of the ring. The upper disc prepared in accordance with this example is centered and adhered to the upper backing surface of the compact disc using the acrylic polymer adhesive of the upper disc. When the compact disc was played in a conventional compact disc player, the addition of the ring and the upper disc resulted in a major improvement in acoustic quality over the compact disc with the ring alone as described in Example 1.

EXAMPLE 3

Another example of a compact disc playback enhancer of the present invention involves the preparation and use of a different annular ring applied to the lower surface or playback surface of a compact disc with a film layer applied to the upper backing surface of the compact disc.

The annular ring has four layers. The first layer or outer layer of the ring is a 2.5-mil (0.0025-inch) thick layer of vinyl film. The second layer is a 1.0-mil (0.0010-inch) thick layer of flexible acrylic polymer adhesive. A suitable vinyl film combined with a layer of acrylic polymer adhesive is marketed as FasCal Durable Film 908 by Avery International, Fasson Specialty Division, Painesville, Ohio. The second layer is used to adhere the first or outer layer to a third layer or substrate, which is a 2.0-mil (0.0020-inch) layer of polyester film. The fourth or adhesive layer is a 1.0-mil (0.0010-inch) layer of flexible acrylic polymer adhesive which is used to adhere the ring to the compact disc. A suitable product that combines the polyester film with acrylic polymer adhesive is marketed as a self-adhesive overlaminating film designated FasCal Super Cold Seal by Avery International, Fasson Specialty Division, Painesville, Ohio. The combined thickness of the four-layer ring is 6.5 mils (0.0065 inches), and the ring has an outer diameter of 1.25 inches and a central opening of 0.66 inches in diameter.

The upper film layer is essentially the same as the upper disc described in Example 2 above. The disc has a 2.0-mil (0.0020-inch) thick, colorless, transparent polyester film coated with a 1.0-mil (0.0010-inch) layer of flexible acrylic polymer adhesive. The resulting disc is 3.0 mils 0.0030 inches) thick, and has an outer diameter of 4.5 inches and a central opening of 0.66 inches in diameter.

The ring prepared in accordance with this example is centered and adhered to the lower surface or playback surface of a compact disc using the acrylic polymer adhesive of the ring. The upper disc prepared in accordance with this example is centered and adhered to the upper backing surface of the compact disc using the acrylic polymer adhesive of the upper disc. When the compact disc was played in a conventional compact disc player, the addition of the ring and the upper disc resulted in a very major improvement in acoustic quality over the original compact disc.

EXAMPLE 4

Another example of a compact disc playback enhancer of the present invention involves the preparation and use of a singular annular ring applied to the area of the spindle of the disc player that contacts the compact disc and a film layer applied to the compact disc. The annular ring has two layers. The outer layer of the ring is a 2.5-mil (0.0025-inch) thick film of flexible vinyl. The second layer is a 1.0-mil (0.0010-inch) thick layer of flexible acrylic adhesive which is used to adhere the ring to the spindle of the compact disc player.

A film layer, essentially the same as the upper disc described in Example 2 above, is applied to the upper surface of the compact disc. The upper film layer is a disc of 2.0-mil (0.0020-inch) thick, colorless, transparent polyester film coated with a 1.0-mil (0.0010-inch) thick, colorless, transparent layer of flexible acrylic polymer adhesive. A suitable product that combines the polyester film with acrylic polymer adhesive is marketed as a self-adhesive overlaminating film designated FasCal Super Cold Seal by Avery International, Fasson Specialty Division, Painesville, Ohio. The resulting disc is 3.0 mils (0.0030 inches) thick, and has an outer diameter of 4.5 inches and a central opening of 0.66 inches in diameter.

The ring prepared in accordance with this example is centered and adhered to the side of the drive spindle that contacts the compact disc. The upper disc prepared in accordance with this example is centered and adhered to the upper surface of the compact disc using the acrylic polymer adhesive of the upper disc. When the compact disc was played in the compact disc player with the annular ring applied to the spindle of the player, the addition of the ring and the upper disc resulted in a very major improvement in acoustic quality over the compact disc played on the original player.

EXAMPLE 5

Another example of a compact disc playback enhancer of the present invention involves the preparation and use of a film layer applied to the upper label surface of the compact disc.

The upper film layer is a disc of 3.5-mil (0.0035-inch) colorless, flexible, transparent vinyl film coated with a 1.0-mil (0.0010-inch) layer of flexible acrylic polymer adhesive. A suitable product that combines the vinyl film with the acrylic polymer adhesive is marketed as FasCal 1440 Clear Calendared Vinyl by Avery International, Fasson Specialty Division, Painesville, Ohio. The resulting disc is 4.5 mils (0.0045 inches) thick, and has an outer diameter of 4.5 inches and a central opening of 0.66 inches in diameter. This film layer is applied to the top of the compact disc.

The film layer prepared in accordance with this example is centered and adhered to the tipper or label surface of the compact disc using the acrylic adhesive of the film as described above. When the compact disc was played in a conventional compact disc player, the addition of the upper layer of flexible film resulted in a major improvement in acoustic quality compared to the original compact disc.

EXAMPLE 6

Another example of a compact disc playback enhancer of the present invention involves the preparation and use of a singular annular ring applied between the compact disc and the area of the spindle that drives the compact disc and a film player applied to the compact disc.

The annular ring is inserted between the playback spindle and the compact disc. The ring consists of a single layer of expanded polystyrene film 4.6 mils (0.0046 inches) thick having an outer diameter of 1.25 inches and a central opening of 0.66 inches in diameter. A suitable expanded polystyrene film is available as Poly S Foam Film from Valcour Imprinted Papers, Inc., Glens Falls, N.Y.

The film layer is essentially the same as the upper film layer described in Example 5 above. The film layer is a disc of 3.5-mil (0.0035-inch) colorless, flexible, transparent vinyl film coated with a 1.0-mil (0.0010-inch) layer of flexible acrylic polymer adhesive. A suitable product that combines the vinyl film with the acrylic polymer adhesive is marketed as FasCal 1440 Clear Calendared Vinyl by Avery International, Fasson Specialty Division, Painesville, Ohio. The resulting disc is 4.5 mils (0.0045 inches) thick, and has an outer diameter of 4.5 inches and a central opening of 0.66 inches in diameter. This film layer is applied to the top of the compact disc.

The annular ring is inserted between the playback spindle and the compact disc. The film layer prepared in accordance with this example is adhered to the upper or label surface of the compact disc. Playback of this combination using a conventional compact disc player resulted in a major improvement in acoustic quality compared to the original compact disc.

These examples apply to conventional audio compact discs as described above having an outer diameter of 4.69 inches and a thickness of 0.58 inches, with a center opening of 0.056 inches in diameter. Of course, the dimensions of the rings and upper discs described in the examples above could be modified for use on other optically encoded playback discs, such as "mini" audio compact discs or video discs.

The invention has been described with respect to compact discs used for audio reproduction, but the same concept can be used with other discs which are rotated and used to record data or information that can be read, such as words or numbers, or which include visual recordings, printed or graphic materials, or other data. Furthermore, the invention has applicability to storage media analogous to compact discs, and which provide read/write capabilities rather than read-only recording.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In combination with a player having a spinning mechanism, a data storage disc for being read in the player, the data storage disc comprising:

a pulse code modulated optical disc having a first side and a second side, the data storage disc having a data retrieval portion on the first side from which data is retrieved by the player and having a drive portion on the first side;

an annular dampening and friction component ring on the first side of the optical disc for engagement by the spinning mechanism, the ring substantially covering the drive portion and leaving the data retrieval portion completely uncovered, the ring made from a soft flexible material and having a friction coefficient greater than that of the optical disc for simultaneously absorbing and dampening vibration of the optical disc and reducing the transmission of vibrations between the optical disc and the spinning mechanism and improving the frictional engagement of the optical disc with the spinning mechanism, the soft and flexible material having a Shore A hardness of between 0 and 100; and a flexible dampening adhesive layer for adhering the ring to the drive portion of the optical disc, the adhesive layer covering the drive portion and leaving the data retrieval portion completely uncovered, the adhesive layer being non-rigid and pliable and made from a soft flexible material for absorbing and dampening and reducing the transmission of vibrations between the optical disc and the spinning mechanism, the adhesive layer interposed between the drive portion of the disc and the spinning mechanism.

2. A data storage disc as defined in claim 1, wherein the material of the ring is substantially softer and more flexible than that of the optical disc.

3. A data storage disc as defined in claim 1, wherein the annular ring is continuous.

4. A data storage disc as defined in claim 1, wherein the material of the ring is transparent.

5. A data storage disc as defined in claim 1, wherein the ring has a mass of less than 7 grams.

6. A data storage disc as defined in claim 1, wherein the ring has a thickness of less than 0.25 millimeters (0.01 inches).

7. A data storage disc as defined in claim 1, wherein the material of the ring is selected from the group consisting of elastomers and rubbers, flexible thermoplastics, thermoplastic elastomers, elastomeric alloys, paper, and mixtures thereof.

8. A data storage disc as defined in claim 1, comprising in addition:

a second annular dampening and friction component ring on the second side of the optical disc; and a second adhesive layer for adhering the second ring onto the second side of the optical disc.

9. A data storage disc as defined in claim 1, wherein the material of the adhesive layer is selected from the group consisting of elastomers and rubbers, flexible thermoplastics, thermoplastic elastomers, elastomeric alloys, paper, and mixtures thereof.

10. A data storage disc playback assembly, comprising:

a spindle for rotating a disc for reading data by a player;

a data storage disc having a first side and a second side, the data storage disc having a pulse code modulated optical data portion on the first side from which data is retrieved by the player and having a drive portion on the first side;

an annular ring on the first side of the optical disc in contact with the spindle, the ring substantially covering the drive portion and leaving the data portion completely uncovered, the ring made from a soft flexible material having a Shore A hardness of between 0 and 100 and having a friction coefficient greater than that of the optical disc for simultaneously (1) absorbing and dampening vibration of the optical disc, (2) reducing the transmission of vibrations between the optical disc and the spindle, and (3) improving the frictional engagement of the optical disc with the spindle; and a dampening adhesive layer interposed between the disc and the spindle, the adhesive layer covering the drive portion and leaving the data retrieval portion completely uncovered, the adhesive layer being non-rigid and pliable and made from a soft flexible material for absorbing and dampening and reducing the transmission of vibrations between the optical disc and the spindle, the adhesive layer adhering the annular ring to the drive portion of the disc.

* * * * *

UNITED STATES PATENT AND TRADEMARK OFFICE
CERTIFICATE OF CORRECTION

PATENT NO. : 5,590,114
DATED : December 31, 1996
INVENTOR(S) : John P. Murphy

It is certified that error appears in the above-indentified patent and that said Letters Patent is hereby corrected as shown below:

Column 3, line 59, "vibrations" should be —vibrational—.
Column 4, line 3, "cloned" should be —slowed—.
Column 4, line 19, "of" should be —on—.
Column 4, line 65, after "there" should be inserted —is—.
Column 6, line 33, "ion" should be —low—.
Column 7, line 3, "tipper" should be —upper—.
Column 7, line 6, "tipper" should be —upper—.
Column 7, line 35, "tapper" should be —upper—.
Column 10, line 57, before "0.0030" an opening parenthesis —(— should be inserted.
Column 11, line 57, "tipper" should be —upper—.

Signed and Sealed this

Eighteenth Day of March, 1997

Attest:

BRUCE LEHMAN

Attesting Officer

Commissioner of Patents and Trademarks